United States Patent [19]

Amano et al.

[11] 4,433,541
[45] Feb. 28, 1984

[54] SECONDARY AIR INTRODUCING APPARATUS FOR INTERNAL COMBUSTION ENGINE

[75] Inventors: Katsuhisa Amano, Tokyo; Tadashi Kumagai, Tsurugashima; Akio Masaki, Oi; Shinichi Shimada, Kamifukuoka; Takeshi Suzuki, Asaka; Shoichi Ohtaka, Oi, all of Japan

[73] Assignee: Honda Giken Kogyo Kabushiki Kaisha, Tokyo, Japan

[21] Appl. No.: 390,831

[22] Filed: Jun. 22, 1982

[30] Foreign Application Priority Data

Jun. 24, 1981 [JP] Japan ............................ 56-92402[U]

[51] Int. Cl.³ .............................................. F01N 3/30
[52] U.S. Cl. ........................................................ 60/293
[58] Field of Search .......................................... 60/293

[56] References Cited

U.S. PATENT DOCUMENTS 4,162,613 7/1979 Tamura et al. .
4,319,452 3/1982 Morita ................................. 60/293

FOREIGN PATENT DOCUMENTS 52-1320  1/1977 Japan ................................. 60/293
53-21320 2/1978 Japan ................................. 60/293
56-34917 4/1981 Japan ................................. 60/293

Primary Examiner—Douglas Hart
Attorney, Agent, or Firm—Armstrong, Nikaido, Marmelstein & Kubovcik

[57] ABSTRACT

A secondary air introducing apparatus for introducing secondary air into the exhaust manifold of an internal combustion engine. The apparatus includes a secondary air introducing passage connected between the air cleaner and the exhaust manifold of the engine, a check valve in the passage arranged to operate in response to pulsation pressure in the exhaust manifold to supply clean secondary air thereto, a first expansion chamber interposed in the passage on an upstream side of the check valve, and a second expansion chamber interposed in the passage on an upstream side of the first chamber. At least the check valve and the first chamber are fixedly mounted on the intake manifold.

3 Claims, 7 Drawing Figures

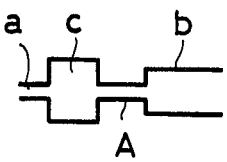
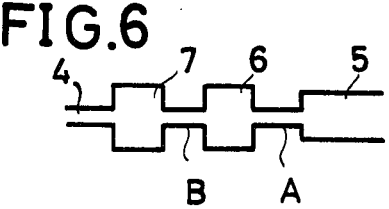
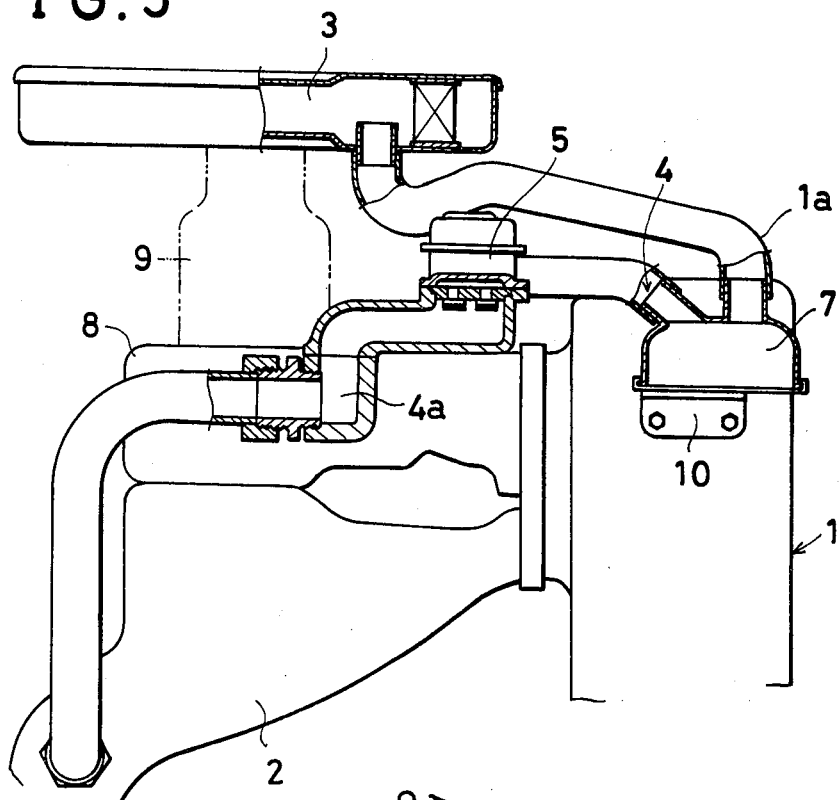
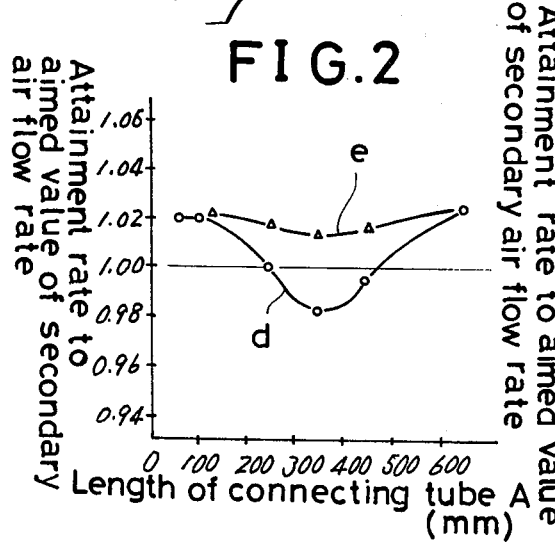
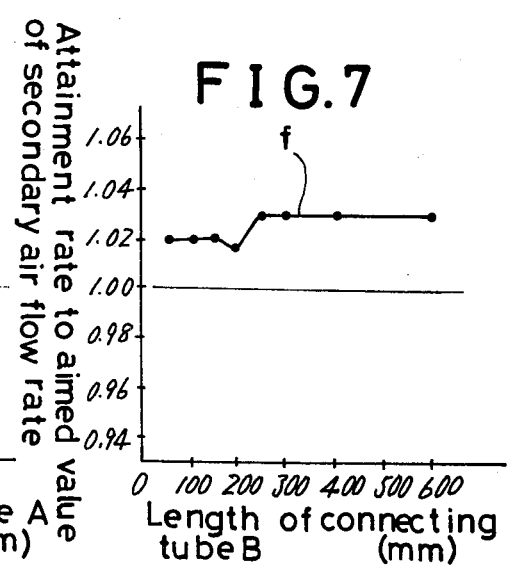

SECONDARY AIR INTRODUCING APPARATUS FOR INTERNAL COMBUSTION ENGINE

BACKGROUND OF THE INVENTION

The present invention relates to a pulsation type secondary air introducing apparatus in an internal combustion engine chiefly used for a vehicle.

A previously known secondary air introducing apparatus utilized on an engine body having an intake manifold, an exhaust manifold and an air cleaner provided at the upstream end portion of the intake manifold comprises a secondary air introducing passage communicating between the air cleaner and the exhaust manifold. A check valve is interposed in the passage arranged to operate in response to a pulsation pressure in the exhaust manifold to feed secondary air thereinto. Additionally, in the foregoing apparatus, there has been proposed an arrangement as shown in FIG. 1, for instance, wherein an expansion chamber c is interposed in the passage a so as to be located on the upstream side of the check valve b. This is so that there may be obtained a predetermined flow rate of secondary air in the passage a. There may also be obtained a silencing effect. The apparatus with this arrangement, however, has the disadvantage that the expansion chamber c must be comparatively large in volume. Consequently, this requires a comparatively large space in the engine compartment of a vehicle.

Especially, in the case of an exhaust pulsation type secondary air introducing apparatus, when it is necessary to introduce secondary air at a high speed rotation of the engine such as in the case of deceleration thereof, it is difficult to assuredly obtain a predetermined flow rate of the secondary air. This is delicately influenced by the length of the secondary air introducing passage a, the volume of the expansion chamber c and the position of the chamber c on the passage a. More in detail, in the case that the chamber c is 350 c.c. in volume, for instance, it often happens that the secondary air flow rate does not reach a predeterminedly aimed one if the length of a connecting tube A between the chamber c and the valve b is not proper. The relation therebetween is as shown by a curve d in FIG. 2. In such a case the silencing effect becomes minimal. When the chamber c is 600 c.c. in volume, for instance, it is shown by a curve e in the same Figure. Thus, the aimed at flow rate can be obtained. Also, the silencing effect is good regardless of the length of the tube A. To sum up, the volume of the chamber c must be larger than 600 c.c., for instance, resulting in the foregoing inconvenience.

OBJECTS AND SUMMARY OF THE INVENTION

The present invention has as an object to provide an apparatus for introducing secondary air into an exhaust manifold of an internal combustion engine which assures the obtaining of a pre-determined flow rate of secondary air regardless of the engine speed.

It is a further object of the present invention to provide an apparatus which is not dependent upon the length of a connective tube between an expansion chamber and the check valve of the apparatus.

It is yet a further object of the present invention to provide an apparatus which is effective for silencing regardless of engine speed.

It is a still further object of the present invention to provide a secondary air introducing apparatus which is simple to install on an engine in a comparatively small engine compartment.

These and other objects are obtained in a secondary air introducing apparatus for an internal combustion engine in accordance with the claims of this application. The engine includes an engine body, an intake manifold, an exhaust manifold, and an air cleaner provided on the upstream end portion of the intake manifold. The apparatus comprises a secondary air introducing passage connected between the air cleaner and the exhaust manifold, a check valve in the passage arranged to operate in response to pulsation pressure in the exhaust manifold to supply clean secondary air thereto, an expansion chamber interposed in the passage on an upstream side of the check valve, and a second expansion chamber interposed in the passage on an upstream side of the first chamber. At least a check valve in the first chamber are fixedly mounted on the intake manifold.

The check valve in the first expansion chamber can be fixed to an upper surface of the intake manifold in such a condition that they are located between an intake pipe extending upwards from the intake manifold and a cylinder head cover on the top portion of the engine body.

The connecting part constituting part of the secondary air introducing passage can be located on the downstream side of the check valve and can be formed to be integral with the intake manifold.

The above and other objects and the attendant advantages of the present invention will become readily apparent by reference to the following detailed description when considered in conjunction with the accompanying drawings wherein:

FIG. 1 is a diagrammatic sketch of a conventional secondary air introducing apparatus;

FIG. 2 is a graphical representation of the characteristics of such a conventional secondary air introducing apparatus;

FIG. 5 is a side view, partly in section of the present invention;

FIG. 6 is a diagrammatic sketch of the present invention; and

FIG. 7 is a graphical representation of the characteristics thereof.

DETAILED DESCRIPTION OF A PREFERRED EMBODIMENT

Figure 3:
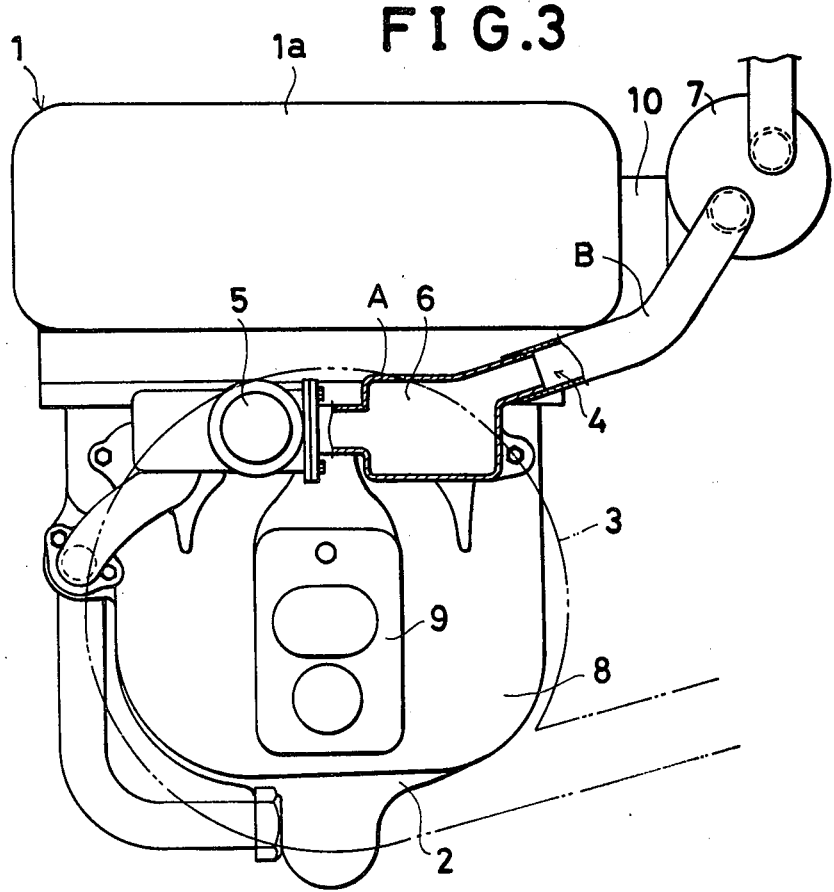
FIG. 3 is the top plan view of one embodiment of the present invention.
Figure 4:
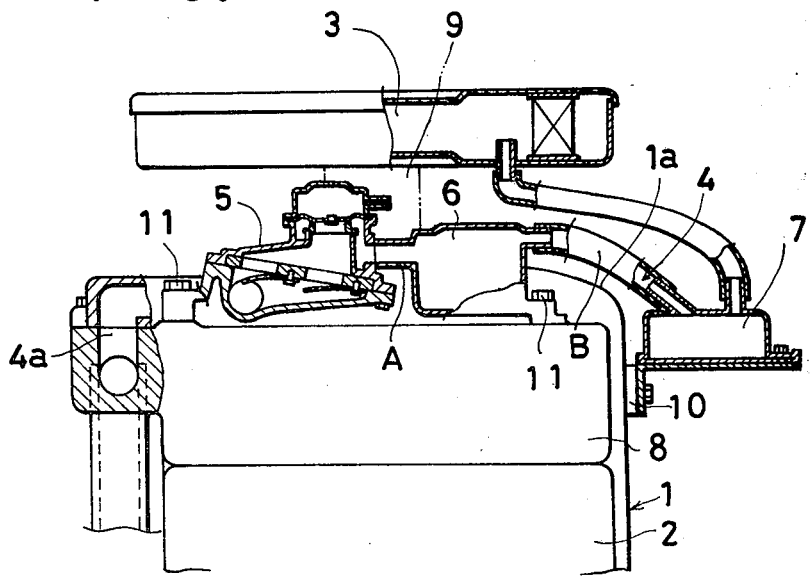
FIG. 4 is a front view, partly in section thereof.

One embodying example of this invention will now be explained with reference to the accompanying drawings:

Referring to FIGS. 3 to 5 showing one example thereof, an engine body 1 having an intake manifold 8, an exhaust manifold 2 and an air cleaner 3 provided on the upstream end portion of the intake manifold 8 is provided with a secondary air introducing passage 4 communicating between the exhaust manifold 2 and the air cleaner 3. There is interposed in the passage 4 a check valve 5 arranged to operate in response to a pulsation pressure in the exhaust manifold 2. The above construction is not especially different from that of the conventional example. According to this invention, a first expansion chamber 6 located on the upstream side of the check valve 5 and a second expansion chamber 7 located on the upstream side of the first expansion chamber 6 are interposed in the passage 4 with at least the check valve 5 and the first expansion chamber 6 being fixedly mounted on the intake manifold 8.

More in detail, in the illustrated example, the exhaust manifold 2 and the intake manifold 8 are formed to project forwards from the engine body 1. An intake pipe 9 extending upwards from the intake manifold 8 is provided on the upper side thereof with the air cleaner 3, so that the secondary air may be introduced from the clean side of the air cleaner 3. Additionally, the check valve 5 and the first expansion chamber 6 are located closely adjacent one with another through a connecting tube A and extend in mutually opposite directions in a space formed between the intake pipe 9 and the engine body 1. The second expansion chamber 7 is provided at a position comparatively remote therefrom and is provided on the right side, in the drawing, of the engine body 1 so as to be positioned outside a distributor fixing portion 10. In this case, an assembly comprising the check valve 5, the first expansion chamber 6 and the intermediate connecting tube A connecting therebetween is put on the upper surface of the intake manifold 8 and is fixed thereto by means of bolts 11 as shown clearly in FIG. 4. Also in this case, a connecting part 4a constituting a part of the passage 4 formed integrally with the manifold 8 on the downstream side of the check valve 5 is provided so that a thermal depriving effect of the exhaust heat to the manifold 8 may be further improved.

The relation of the check valve 5 with the first and second expansion chambers 6, 7 is as shown in FIG. 6, for instance. In a case where the length of the connecting tube A between the check valve 5 and the first expansion tube 6 is set to be 40 mm, and the length of the connecting tube B between the two chambers 6, 7 is variously changed, the attainment rate of the secondary air flow rate is as shown by a curve f in FIG. 7, for instance, in accordance with the inventor's experiments. Thus, it has been confirmed that the predetermined attainment rate can be obtained regardless of the length of the connecting tube B. Additionally through many experiments on the silencing effect, also it has been confirmed that it is good. Accordingly, the second expansion chamber 7 can be provided in any desired portion in a space in the engine compartment such as at a side portion of the engine body 1 as shown in FIGS. 3 and 4, a vehicle body portion in the engine compartment or such a side of the intake manifold that does not provide the secondary air introducing passage 4. In the illustrated example, the first expansion chamber is 180 c.c. and the second expansion chamber 7 is 200 c.c.

Thus, according to this invention, an expansion chamber is constructed as two separate ones comprising the first expansion chamber and the second expansion chamber, so that each of the chambers can be made comparatively small in size. For attaining a predetermined effect, the whole of the two chambers is sufficient with about a half in volume as compared with the case that the predetermined effect is obtained by a single expansion chamber. Additionally, it is possible to dispose the first expansion chamber together with the check valve, on one side of the engine body and the second expansion chamber on the other side thereof, for instance. This can prevent the whole of the two chambers from being largely swelled out only from one side of the engine body, and also can make it possible to put them in a comparatively small engine compartment space. Further, the first expansion chamber and the check valve are fixed to the intake manifold, so that a stable attachment thereof can be assured and lowering of the heat thereof can be carried out effectively. This makes it possible to protect the same effectively from the thermal harm.

It is readily apparent that the above-described secondary air introducing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A secondary air introducing apparatus for an internal combustion engine, said engine including an engine body, an intake manifold, and an air cleaner provided on an upstream end portion of the intake manifold, said apparatus comprising a secondary air introducing passage connected between said air cleaner and said exhaust manifold, a check valve in said passage arranged to operate in response to pulsation pressure in said exhaust manifold to supply clean secondary air thereto, a first expansion chamber interposed in said passage on an upstream side of said check valve, and a second expansion chamber interposed in said passage on an upstream side of said first chamber, at least said check valve and said first chamber being fixedly mounted on said intake manifold.

2. An apparatus as claimed in claim 1, wherein the check valve and the first expansion chamber are fixed to an upper surface of the intake manifold in such a condition that they are located between an intake pipe extending upwards from the intake manifold and a cylinder head cover on the top portion of the engine body.

3. An apparatus as claimed in claim 2, wherein a connecting part consitituting a part of the secondary air introducing passage is located on the downstream side of the check valve and is formed to be integral with the intake manifold.

* * * * *